Jan. 26, 1943.     E. E. WEMP     2,309,559
MECHANISM FOR TRANSMITTING POWER

Filed Oct. 20, 1941     3 Sheets-Sheet 1

INVENTOR.
Ernest E. Wemp
BY
Barnes, Kisselle, Laughlin & Raisch
Attorneys

Jan. 26, 1943.  E. E. WEMP  2,309,559
MECHANISM FOR TRANSMITTING POWER
Filed Oct. 20, 1941  3 Sheets-Sheet 2
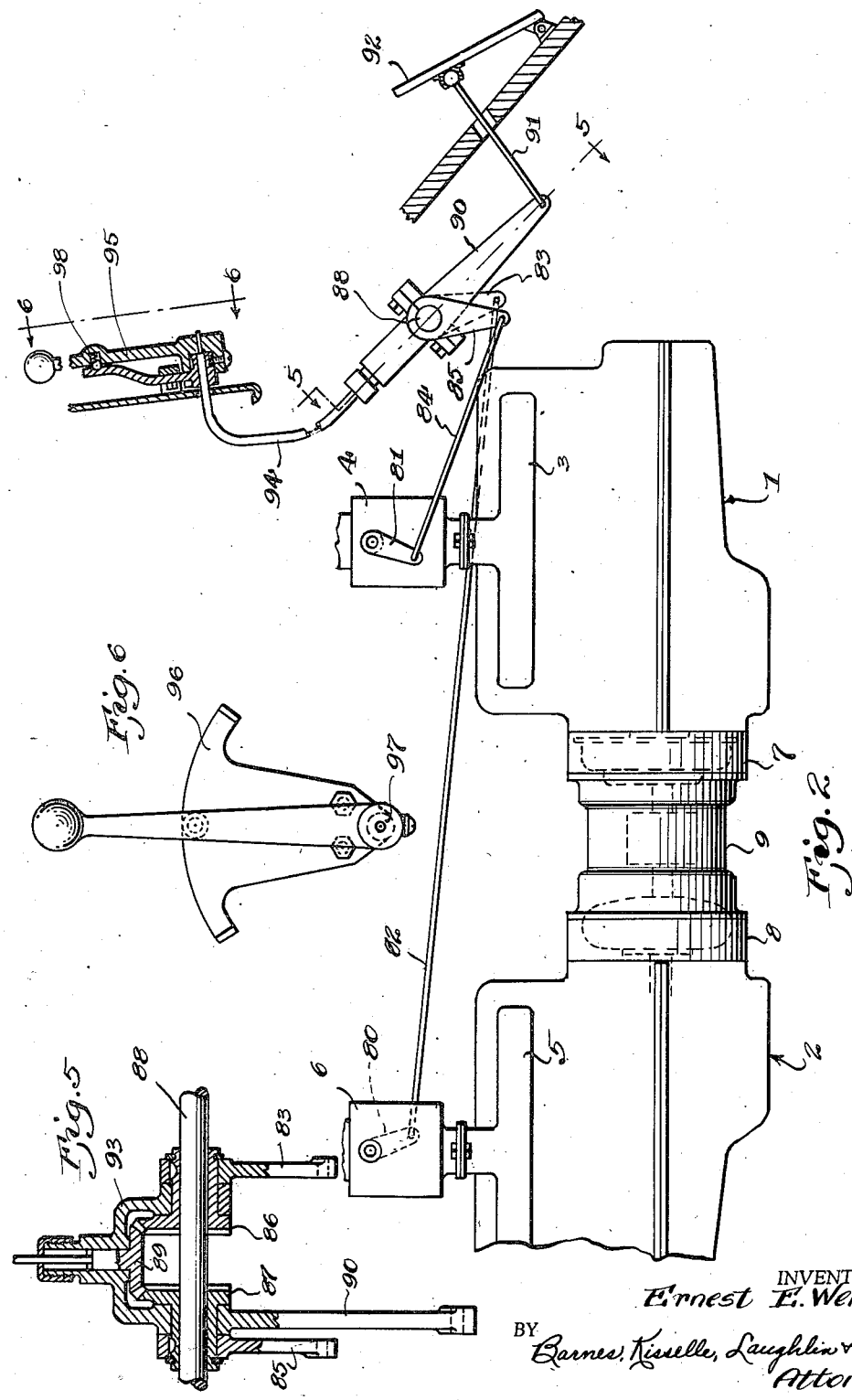
INVENTOR.
*Ernest E. Wemp*
BY *Barnes, Kisselle, Laughlin & Raisch*
*Attorneys.*

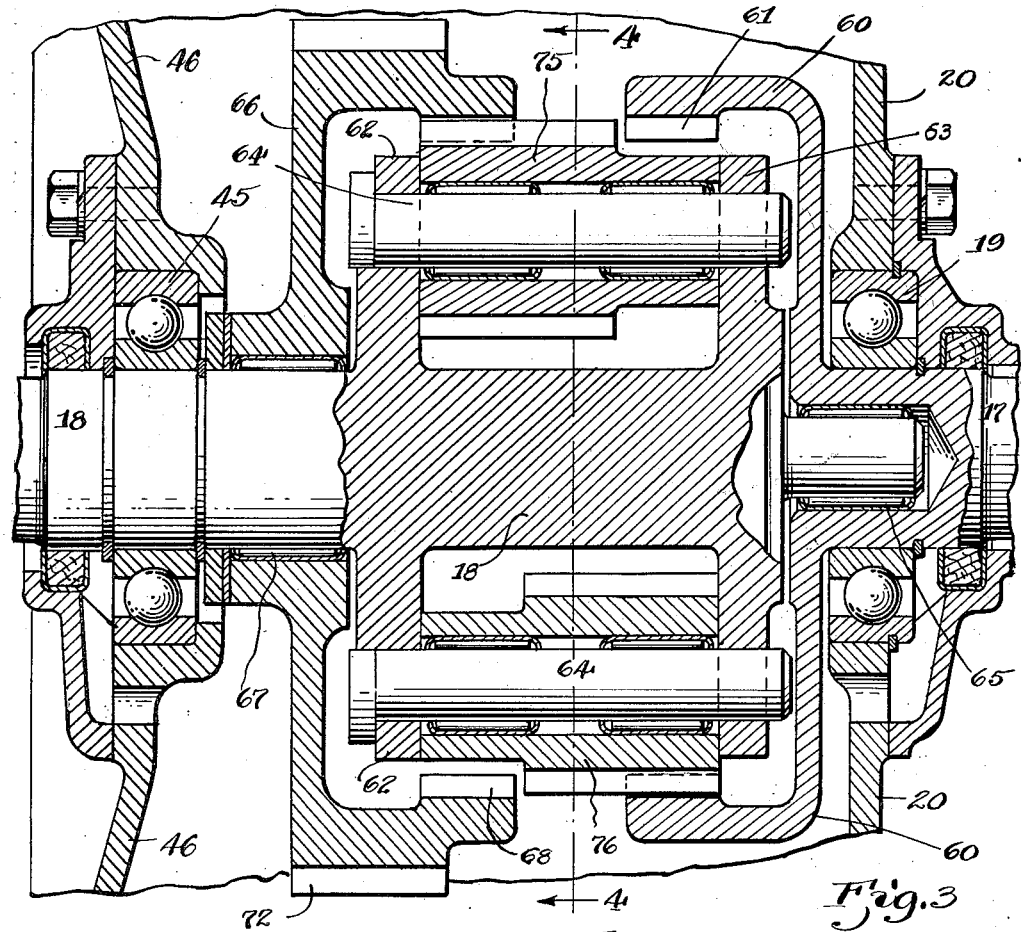

Patented Jan. 26, 1943

2,309,559

UNITED STATES PATENT OFFICE 2,309,559

MECHANISM FOR TRANSMITTING POWER

Ernest E. Wemp, Detroit, Mich.

Application October 20, 1941, Serial No. 415,713

3 Claims. (Cl. 74—472)

This invention relates to a mechanism for the transmission of power to a driven member. The invention is directed particularly to an arrangement where a plurality of drivers are arranged to transmit power through an epicyclic gearing to the driven member.

The epicyclic gearing may be considered as involving three elements, two of which may be gears and the third of which may be the carrier for planet pinions. The two drivers are connected to two of the elements and the driven member is connected to the third. With this arrangement the speed of rotation of the driven member may be determined by the relative speeds of rotation of the drivers. Moreover, the speeds of the drivers may be so relatively adjusted as to impart no rotation to the driven member, in which case the driven member stands at rest or at zero R. P. M. The drivers, of course, may be prime movers or elements driven by prime movers.

Among the objects of the present invention, is the provision of an arrangement for effectively obtaining an at rest condition, or in other words, a status of zero R. P. M. of the driven member, notwithstanding the fact that the drivers or prime movers are not precisely operating at the theoretical relative R. P. M.'s as dictated by the epicyclic gearing for establishing zero R. P. M. for the driven member. To this end a fluid coupling is provided in the power line of at least one prime mover or driver and preferably between the driver and the epicyclic gearing. Such a fluid coupling provides a full torque coupling under proper conditions, but in addition is arranged to provide a substantially zero torque coupling under other conditions. If the impeller and runner of a fluid coupling are rotated at the same speed, the vortex flow in the coupling is reduced to zero and there is a zero torque reaction between the impeller and runner. Likewise, small differences in speeds between impeller and runner, particularly at low speeds, result in very low torque reactions between impeller and runner. The invention makes use of this characteristic of a fluid coupling to insure a substantially zero torque on the driven member at zero speed of the driven member. Thus the fluid coupling is used for two distinct or double purposes.

Moreover, a coupling is preferably provided for at least one of the drivers for entirely disconnecting the same for control purposes, and such a coupling may be in the form of either a friction clutch, a clutch embodying a dental or jaw engagement or other connecting means.

The invention finds applicability in connection with internal combustion engines where there is difficulty in controlling the fuel supply systems thereof with an accuracy such as to obtain precise relative R. P. M.'s, and the accompanying drawings illustrate the invention as associated with internal combustion engines. In these drawings, Fig. 1 is a horizontal section taken through what may be termed the transmission, and illustrating the ends of the crank-shafts of the engines.

Fig. 2 is a side elevational view of the two engines coupled together with the power transmitting means and showing the control mechanism.

Fig. 3 is an enlarged sectional view taken through the epicyclic gearing.

Fig. 4 is a sectional view taken substantially on line 4—4 of Fig. 3.

Fig. 5 is a sectional view showing some of the control mechanism and taken substantially on line 5—5 of Fig. 2.

Fig. 6 is an elevational view of a control element taken substantially on line 6—6 of Fig. 2.

Figure 1:
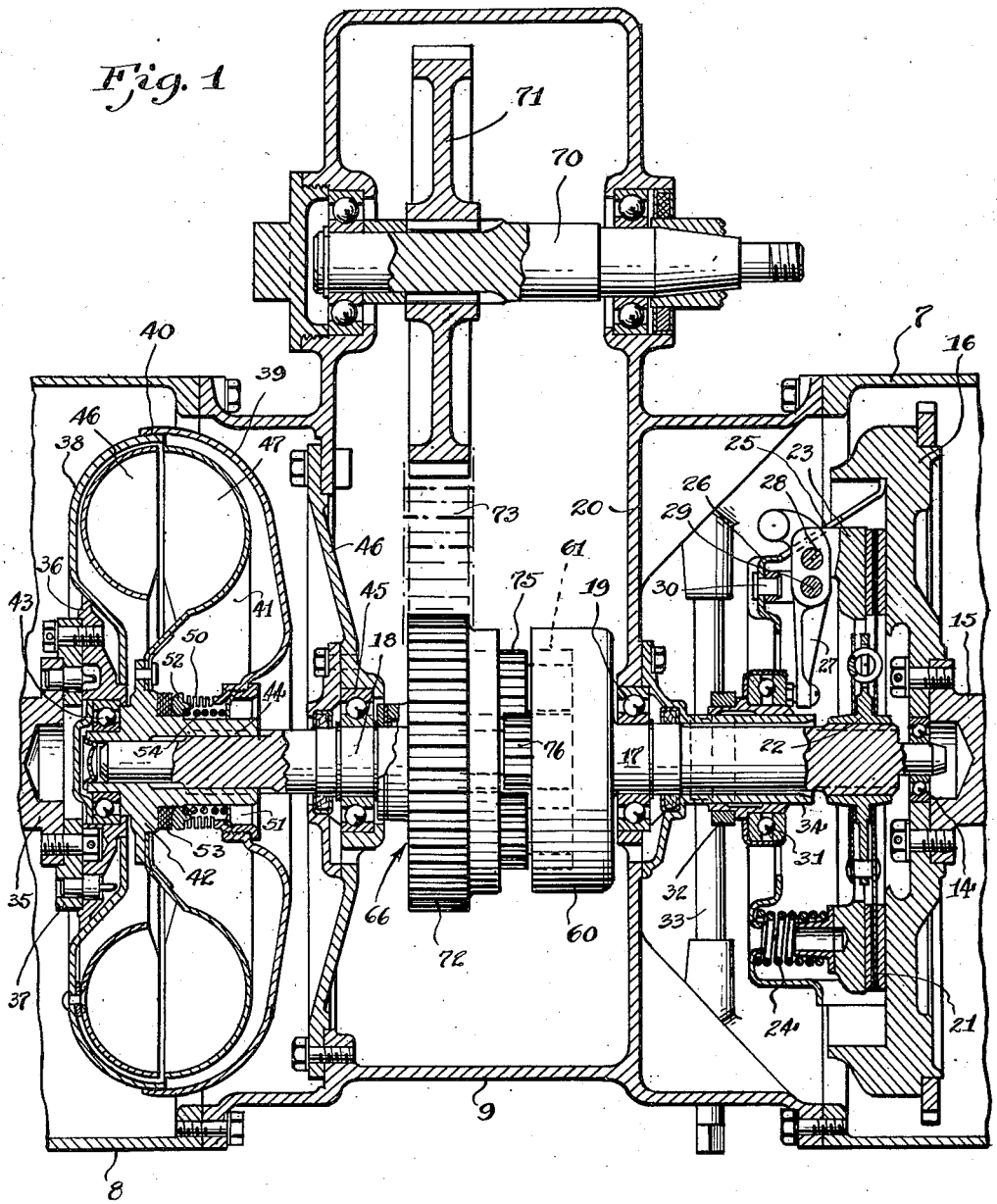

In Fig. 2 there is shown two internal combustion engines 1 and 2. These are merely diagrammatically illustrated and each has fuel supply means of any suitable type but illustrated herein as in the form of a manifold 3 and a carburetor or its equivalent at 4 for the engine 1, and a manifold 5 and carburetor or its equivalent 6 for the engine 2. Each engine may have a projecting housing or bell as a part thereof as illustrated at 7 and 8. The engines are arranged end to end on the same axis and, with the transmission shown, are arranged to rotate in the same direction.

As more clearly shown in Fig. 1, a housing 9 is placed between the engines and connected to the bell portions 7 and 8 thereof, and this housing accommodates the transmission and closes the bell portions.

The crank-shaft of the engine 1 is illustrated at 15 and attached to which may be the usual flywheel 16. A shaft 17 has one end piloted in the flywheel as illustrated at 18, and it is journaled as at 19 in a web 20 of the casing 9. The positive mechanical coupling for one engine may advantageously be incorporated between the crank-shaft 15 and the shaft 17. As shown herein this is in the form of a friction clutch. A driven disc generally indicated at 21 has a hub splined or otherwise connected to the shaft 17 at 22 and facings adapted to be frictionally engaged between the flywheel 16 and a pressure plate 23. The engagement may be effective by suitable packing springs arranged in an annular array and one of which is indicated at 24. The pressure plate has a driving connection as at 25 with a cover plate 26 which is secured to the flywheel.

For the purpose of releasing the clutch, levers are provided, one of which is indicated at 27. Each lever is pivotally connected to the pressure plate as at 28 and pivotally connected at 29 to a bracket 30 carried by the cover plate. A throw-out bearing is illustrated at 31 and which is arranged to be shifted to the right, as Fig. 1 is viewed, by a fork 32 arranged to be shifted by a rock shaft 33. The bearing is slidably mounted on an extension 34 carried by the housing 9. It will be observed that upon rocking the shaft 33 the fork 32 may be caused to shift the throw-out bearing to the right, thus to rock the levers on their fulcrums 29 and retract the pressure plate for clutch disengaging purposes. The clutch illustrated is merely one of a number of different forms which may be employed, and further detailed consideration thereof is not necessary herein.

The crank-shaft of the engine 2 is illustrated at 35 and the fluid coupling is provided between this crank-shaft and shaft 18. The impeller of the fluid coupling comprises a plate 36 connected to the crank-shaft through the means of an adapter 37, and welded to the plate 36 is a member 38 which may be a metal stamping. An enclosure member 39, which may also be a metal stamping, is welded to the member 38 as at 40, and this member extends inwardly and has a sealed connection with a hub as will presently be seen.

The runner of the coupling is illustrated at 41 and it may be a metal stamping secured to a hub 42. This hub is journaled or piloted in the crank-shaft as by means of a bearing 43 and it has a driving connection as at 44 with the shaft 18, which shaft is journaled as at 45 in a closure plate 46 secured in the casing 9.

The impeller and the runner have facing concavities providing an annular torus chamber and the concavities are provided with vanes 46 and 47 with close clearances therebetween. The member 39 has a sealed connection with the hub 42 shown as being in the form of a metallic bellows 50 secured to the member 39 by a plug 51 and having a nose 52 which engages a friction member such as a ring of carbon 53 which butts up against the flange of the hub. A coil spring 54 maintains a tight engagement at the running faces between the nose 52 and the ring 53. This illustration of the fluid coupling is designed to show a somewhat conventional construction for a coupling of this type. The chamber constituted by the members 38 and 39, which is fluid tight, is adapted to be filled with a suitable liquid such as oil, and the torus chamber is likewise adapted to be full of the liquid, with the result that torque is transmitted from the engine 2 to the shaft 18 through the fluid coupling.

The epicyclic gearing is advantageously disposed in direct relationship with the two shafts 17 and 18, and this is shown in detail in Fig. 3. One member of the epicyclic gearing, as shown, takes the form of an internal gear 60 having gear teeth 61, and this gear member may be integral with the shaft 17. Another member which may be integral with the shaft 18 is in the form of a carrier for the planetary pinions, the carrier having flanges 62 and 63 for carrying pins 64 upon which the pinions are journaled. The shaft 18 may be piloted in the shaft 17 as at 65. The third member of the gearing is illustrated at 66 journaled as at 67 on the shaft 18, and it has an internal gear formation with teeth 68. This third member is the driven member, although for the final transmission of the power a final driven shaft is shown at 70 journaled in the housing 9 and provided with a sprocket member 71. The member 66 may have sprocket teeth 72 and a chain 73 connects the members 66 and 71. This chain structure, of course, is only one way of transmitting the power to the final driven shaft 70.

The pinions for interconnecting the epicyclic members 60 and 66 are arranged in pairs with the teeth of the pinions of each pair meshing with each other, and with one pinion of each pair having its teeth meshing with the member 60 and the other pinion of each pair having its teeth meshing with the member 66. To this end the members 60 and 66 are spaced axially so as to provide a space therebetween. The gear teeth on the pinion 75 mesh with the teeth on the member 66 and extend out into the space between the members 66 and 60, but this pinion is reduced in diameter so as to clear the teeth on the member 60. Pinion 76 is substantially the same as pinion 75 but is reversed so that the teeth thereof mesh with the gear teeth on the member 60 and project out into the space between the member 60 and the member 66, but clear the teeth 68. This is shown respectively in the upper and lower portions of Fig. 3. Each pair of pinions comprises a pinion 75 and a pinion 76 and their teeth mesh as shown in Fig. 4, this meshing occurring in the space between the members 60 and 66. With this arrangement it will be seen, by reference to Fig. 4, that the engines operate in the same direction of rotation. For instance, as the shaft 18 is rotating counter-clockwise, then the carrier for the pinions is rotating counter-clockwise, and assuming that the member 66 is stationary, the pinions 75 are rotated clockwise around their axes; this results in a counter-clockwise rotation of the pinions 76 around their axes and a counter-clockwise direction of rotation of the member 60, and therefore the engine 1. This, of course, is a relative condition and is indicated by the arrows in Fig. 4, one of which, for indicating the direction of rotation of the members 60, is shown in dotted lines.

It is perhaps helpful to herewith give a table showing a few of the relative speeds of rotation of the two engines and of the driven member.

*Speed table*

FORWARD SPEEDS

| Driven No. 2 | Driven No. 1 | Driven member |
|---|---|---|
| 1000 | 2000 | 0 |
| 1100 | 1900 | 300 |
| 1200 | 1800 | 600 underdrive |
| 1300 | 1700 | 900 |
| 1400 | 1600 | 1200 |
| 1500 | 1500 | 1500 direct |
| 1600 | 1400 | 1800 |
| 1700 | 1300 | 2100 overdrive |
| 1800 | 1200 | 2400 |

REVERSE SPEEDS

| 1000 | 2000 | 0 |
|---|---|---|
| 900 | 2100 | −300 |
| 800 | 2200 | −600 |
| 700 | 2300 | −900 |

If the relationship between the engine 2 and engine 1 is 1 to 2, then the driven shaft stands at zero. As the R. P. M. of engine 2 increases relative to the R. P. M. of engine 1, the driven shaft is operated in a direction which may be considered the forward direction, and when the two engines operate at the same speed there is the equivalent of a direct drive, with the driven member operating at the same speed. For instance, as shown in the table, 1000 R. P. M. for engine 2 and 2000 R. P. M. for engine 1 results in zero R. P. M. of the driven member. But if the two engines operate at 1500 R. P. M. then the driven shaft operates at 1500 R. P. M. This arrangement also provides for an over drive, or in other words a situation where the driven member operates faster than either engine. This occurs, as shown by the table, when the R. P. M. of the engine 2 exceeds that of engine 1. Accordingly, an infinitely variable torque and speed ratio between the two engines and the driven member can be obtained. The driven member may be operated in the opposite direction or which may be considered reverse, and this is obtained, as shown by the speed table, by widening the R. P. M. ratio between the two engines. In other words, as shown, if engine 2 is decreased in R. P. M. and engine 1 increased in R. P. M., the driven shaft operates reversely. It is obvious that the R. P. M. of only one engine need be varied to decrease or increase the R. P. M. ratio between the engines to effect the various drives, whether under-driving, direct, over-driving or reverse.

The control for the engines may advantageously be as illustrated in Figs. 2, 5 and 6. Here the carburetor or other fuel supply means for the engine 2 has a control arm 80 and the carburetor for the engine 2 has a control arm 81 which increase the fuel supply as they are rocked clockwise. A rod 82 connects the arm 80 to a control arm 83, while a rod 84 connects the arm 81 to a control arm 85. These two arms are connected to gear segments 86 and 87 journaled on a shaft 88 and the teeth of which mesh with a pinion 89. A primary control arm 90 may be connected through a suitable link 91 to an accelerator treadle or like control element as shown at 92 and the member 90 includes a housing 93 in which the pinion 89 is journaled. Other control means is provided for rotatably controlling the pinion 89, and this as shown may be in the form of a Bowden wire 94 extending to a suitably located place for operation thereof, and to one end of which is connected a control member 95. This control member may operate over a segment 96, the control member being pivoted at 97, and the arrangement may incorporate a detent 98 which, as near as practical, is a position for determining a ratio between the two engines for providing zero R. P. M. for the driven member.

In a system of the type described wherein there is a divided drive, it is necessary that, in order to transmit torque from the engine 2 to the driven member, a reaction to the torque of the engine 2 must be provided by the engine 1, the amount of the reaction being in accordance with their speed relationship. Also, the engine 2 must provide a reaction to the torque of the engine 1 in order to transmit the torque of engine 1 to the driven member.

The operation is as follows: The controlling means for the engine speeds becomes, in effect, a torque control. The pedal 92 is used to simultaneously increase or decrease the engine speeds while the control 95 determines the relative R. P. M's. of the engine. When the speed relationship of the engines is 1 to 2, the driven shaft is at zero as would be the case, for example, when the engine R. P. M's. are 1000 and 2000 R. P. M's. respectively. Manipulation of the control 95 may accelerate the engine 2 and decelerate the engine 1 to thus provide an infinitely variable ratio relative to the driven member. With a satisfactory ratio obtained, both engines may be accelerated or decelerated. For reverse speeds, the engine 1 is accelerated and the engine 2 decelerated. The fluid coupling provides a plurality of results. For example, with the engines operating at relatively high speeds the control 95 may be quickly thrown to change the speed ratio between the engines either upwardly or downwardly and the fluid coupling absorbs the shock. An important function, however, of the fluid coupling is for establishing a zero R. P. M. of the driven member. It will be understood that it is next to impossible to obtain, from time to time, a precise 1 to 2 speed relationship between the two engines in order to obtain an at rest condition for the driven member. But even though there is a slight variation, the fluid coupling will slip so as to provide an at rest condition of the driven member with substantially inconsequential torque transmitted thereto. The engine 1 may be considered the leading engine. To show this the results of tests may be given which are made with a 12⅜ inch diameter fluid coupling. With the leading engine operating at 1000 R. P. M., and therefore driving the runner at 500 R. P. M., and the engine 2 driving the impeller within plus or minus 5% of 500 R. P. M., the resulting drag torque was between 2.6 and 7.0 lbs. feet. When the engine 2 was operated between the extremes of plus and minus 10%, the resulting drag torque was between 5.25 and 8.75 lbs. feet. In prior installations of fluid couplings of this same size and type, it is expected that the impeller operate at about 500 R. P. M. with the runner stalled or when the car is at rest, and this situation results in a drag torque of about 52.5 lbs. feet. It will accordingly be seen that if the engine 2 is controlled within plus or minus 5% of the runner speed in obtaining the zero condition for the driven member, the resulting drag torque is about 13.5% of that transmitted when the impeller is operated at about 500 R. P. M., and the runner stalled, and if the control is governed within plus or minus 10% the drag torque is about 16.7% of that of a stalled runner condition. This small percentage of drag torque is not sufficient to provide any effective creeping of an automobile or other vehicle where the system is employed in such a vehicle.

The torque transmitting relationship between the engines and the driven member may be completely discontinued by the releasing of the mechanical coupling, shown herein as a friction clutch. This obviously disconnects the leading engine 1, and since this also removes the reaction torque necessary for the engine 2 to transmit torque to the driven member through the divided drive, the engine 2 is also rendered ineffective. This condition is desirable where it is necessary to tow or push or otherwise move or manipulate a vehicle with its engines at rest, or for that matter with its engines idling.

I claim:
1. In combination, a driver, a second driver, a driven member, epicyclic gearing having three members, means connecting the driven member to one of the members of the epicyclic gearing, means connecting one driver to another of the epicyclic gearing, a fluid coupling connecting the other driver to the third member of the epicyclic gearing, control means for substantially simultaneously increasing and decreasing the power output of the two drivers, said control means including means for varying the power output of the two drivers relative to each other whereby to vary their relative speeds of rotation to establish variable speed and torque ratios between the drivers and driven member and to theoretically establish a relative rotation between the drivers for establishing zero speed of rotation of the driven member, said fluid coupling adapted to slip for obtaining zero speed of rotation of the driven member when the drivers are adjusted to approximate relative speeds for zero speed of rotation of the driven member and said fluid coupling adapted to absorb shock upon sudden change in the speed ratio between the drivers.

2. In combination, a driver, a second driver, a driven member, epicyclic gearing having three members, means connecting the driven member to one of the members of the epicyclic gearing, means connecting one driver to a second member of the epicyclic gearing, a fluid coupling for connecting the other driver to the third member of the epicyclic gearing, a releasable mechanical coupling in the connection between one driver and the epicyclic gearing, control means for substantially simultaneously increasing and decreasing the power output of the two drivers, said control means including means for varying the power output of the two drivers relative to each other whereby to vary their relative speeds of rotation to establish variable speed and torque ratios between the drivers and driven member and to theoretically establish a relative rotation between the drivers for establishing zero speed of rotation of the driven member, said fluid coupling adapted to slip for obtaining zero speed of rotation of the driven member when the drivers are adjusted to approximate relative speeds for zero speed of rotation of the driven member and said fluid coupling adapted to absorb shock upon sudden change in the speed ratio between the drivers.

3. The combination with two internal combustion engines and a driven member, of an epicyclic gearing having three members, means connecting one member of the epicyclic gearing to the driven member, means including a fluid coupling for connecting one engine to a second member of the epicyclic gearing, means connecting the other engine to the third member of the epicyclic gearing, a releasable coupling in the connection between one engine and the epicyclic gearing, control means for substantially simultaneously increasing and decreasing the power output of the two engines, said control means including means for varying the power output of the two engines relative to each other whereby to vary their speeds of rotation relative to each other to establish variable speed and torque ratios between the engines and the driven member and whereby the two engines may be given relative speeds of rotation approximating the ratio for establishing zero speed of rotation of the driven member, said fluid coupling being adapted to slip when the two engines have a speed ratio which approximates that ratio for giving zero speed of rotation of the driven member to thus obtain zero speed of rotation of the driven member and said fluid coupling adapted to absorb the shock incident to a sudden change in the speed ratio between the engines.

ERNEST E. WEMP.